June 12, 1945.  M. RELSON  2,377,902
DIRECTION FINDER
Filed Oct. 7, 1941  4 Sheets-Sheet 3
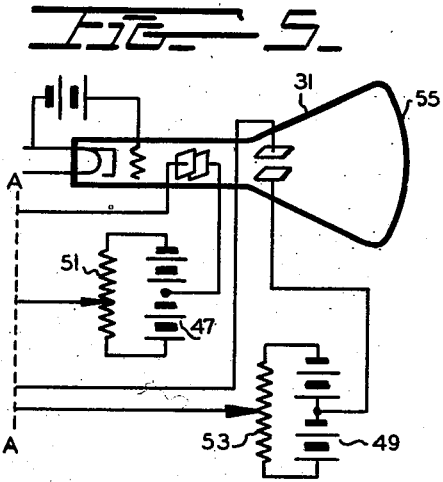
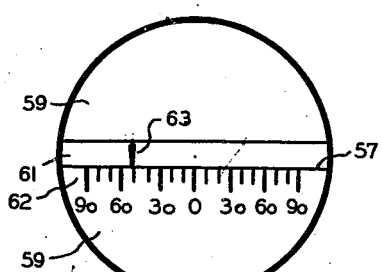
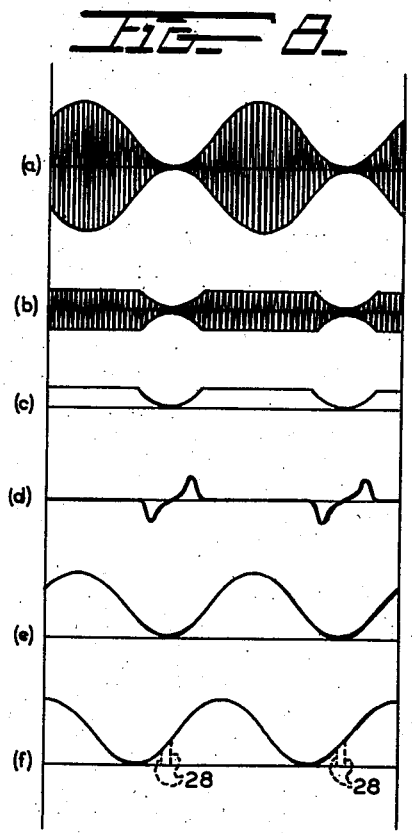
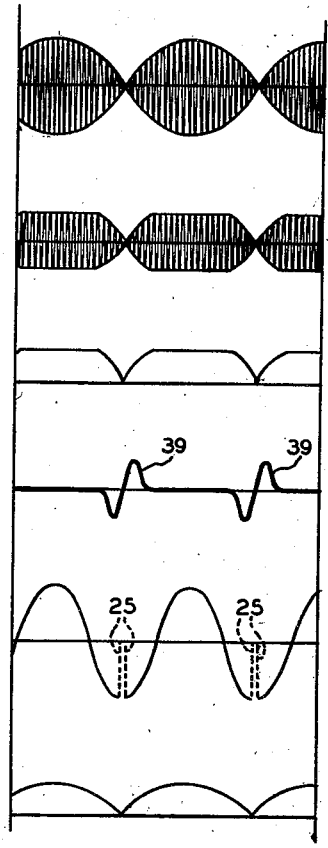
INVENTOR,
MORRIS RELSON,
BY
Herbert A. Thompson
HIS ATTORNEY June 12, 1945.  M. RELSON  2,377,902
DIRECTION FINDER
Filed Oct. 7, 1941  4 Sheets-Sheet 4
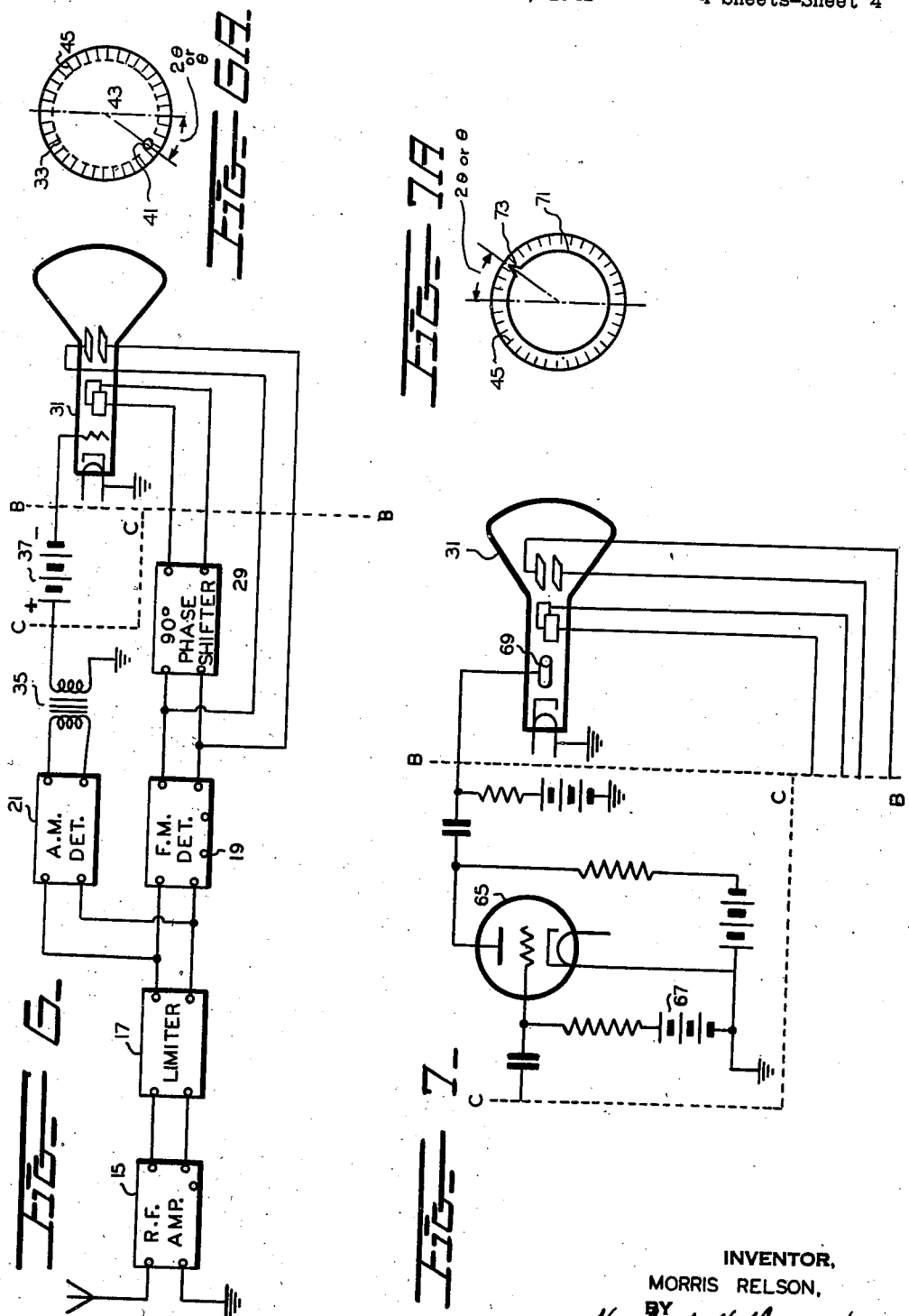

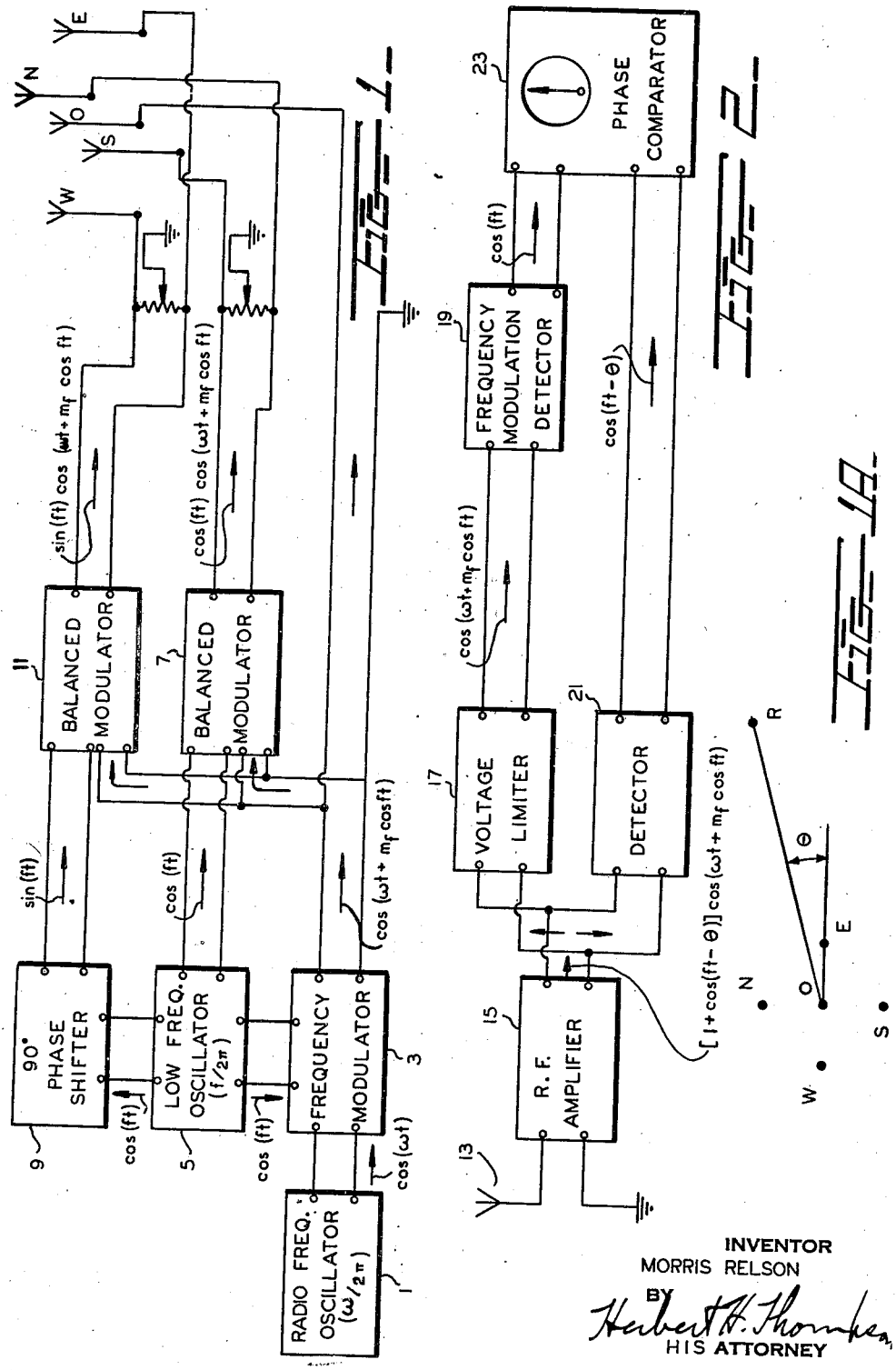

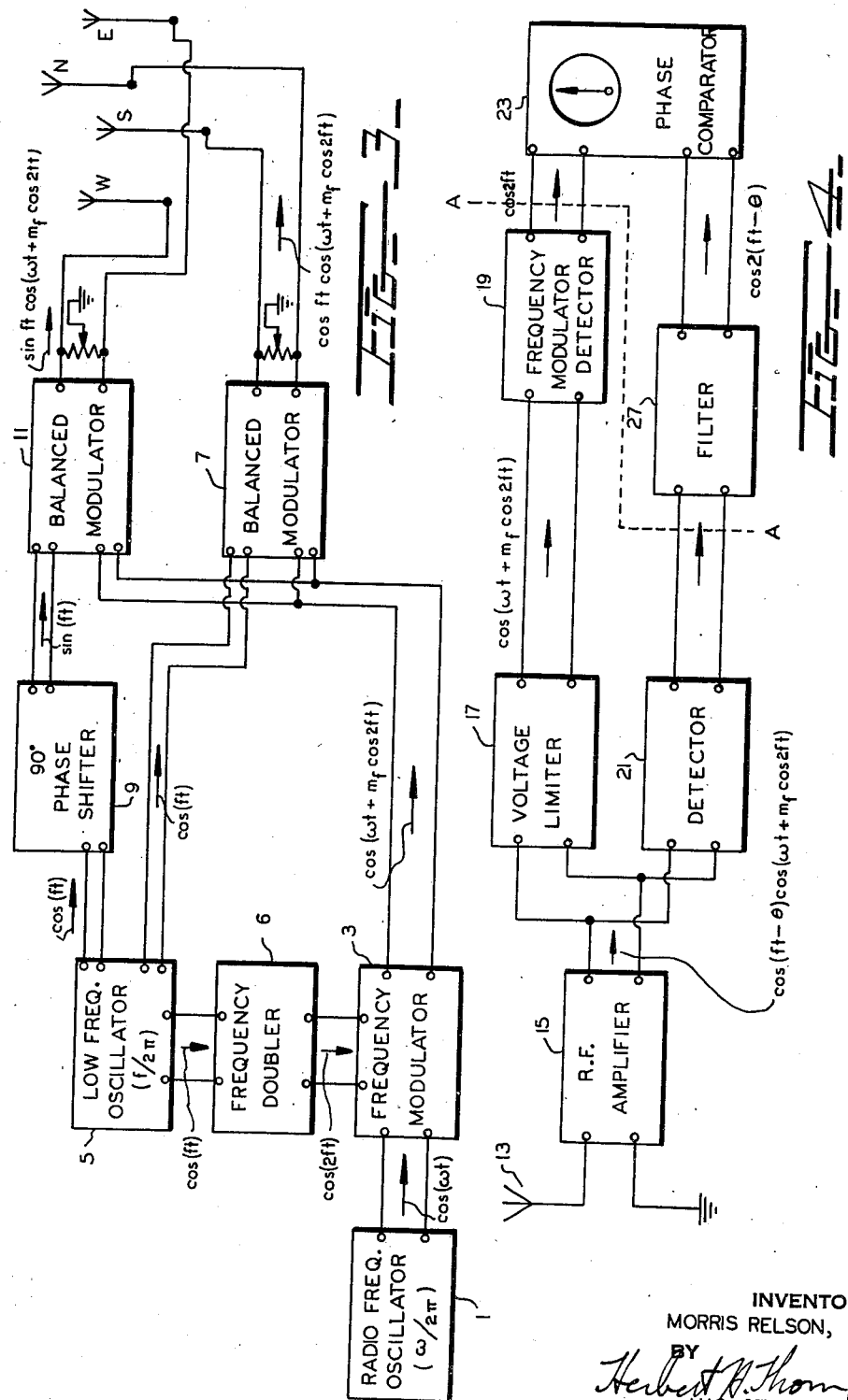

Patented June 12, 1945

2,377,902

UNITED STATES PATENT OFFICE 2,377,902

DIRECTION FINDER

Morris Relson, Brooklyn, N. Y., assignor to Sperry Gyroscope Company, Inc., Brooklyn, N. Y., a corporation of New York Application October 7, 1941, Serial No. 413,925

30 Claims. (Cl. 250—11)

The present invention relates to the art including direction finders, especially those using rotating directional radio beams.

Systems are known in which a continuously rotating cardioid radiation pattern is transmitted in conjunction with an omnidirectionally radiated carrier modulated by a reference frequency equal to that of the angular rotation of the directional pattern, whereby a comparison of the phase of the reference modulating frequency with the phase of the amplitude modulation created by movement of the rotating radiation pattern past the receiving antenna will indicate the azimuthal orientation of the receiver.

One defect of the former system lies in the necessity for using a carrier or sub-carrier for the reference frequency in addition to that needed for the rotating radiation pattern. The present invention overcomes this difficulty by using the rotating radiation pattern itself to carry the reference frequency by simultaneous frequency or phase modulation of the rotating pattern.

A further difficulty of the prior art device has been the necessity for radiating energy omni-directionally in addition to the rotating directional pattern. The present invention contemplates overcoming this objection by eliminating any omni-directional radiation.

Accordingly, it is an object of the present invention to provide an improved radio direction-finding system using rotating directional radio beams.

It is a further object of this invention to provide an improved direction-finding system using rotating directional radio beams simultaneously frequency or phase modulated by a reference frequency.

It is another object of this invention to provide an improved direction-finding system using a rotating directional radio beam simultaneously frequency or phase modulated by a reference frequency which is an exact multiple or sub-multiple of the frequency of rotation of the beam.

It is still another object of this invention to provide an improved receiver for a direction-finding system of the above type which does not require any omni-directional radiation for successful operation.

In the drawings,

Fig. 1 shows a schematic circuit diagram of one form of transmitter of the invention.

Fig. 1A shows a plan view of the antenna system of Fig. 1 or 3.

Fig. 2 shows a receiver suitable for use with the transmitter of Fig. 1.

Fig. 3 shows a modified form of transmitter.

Fig. 4 shows a receiver suitable for use with the transmitter of Fig. 3 or Fig. 1.

Fig. 5 shows a modification of a portion of the receiver of Fig. 4.

Fig. 5A shows an elevation view of the face of the cathode ray tube indicator of Fig. 5.

Fig. 6 shows a modified receiver circuit suitable for use with the transmitter of Fig. 1 or 3.

Fig. 6A shows a view of the face of the cathode ray tube indicator of Fig. 6.

Fig. 7 shows a modification of a portion of Fig. 6.

Fig. 7A shows the face of the cathode ray tube indicator of Fig. 7.

Figs. 8 and 9 are explanatory diagrams for use with the transmitters of Figs. 1 and 2 respectively.

Fig. 1 shows one form of transmitter. A radio frequency wave of frequency $\omega/2\pi$ from radio frequency oscillator 1 is modulated by a suitable low frequency wave of frequency $f/2\pi$, obtained from source 5, in an FM (frequency modulation) modulator 3 whose output is then supplied directly to an omni-directional antenna O.

The output of FM modulator 3 is fed into a balanced modulator 7, to which is also fed a wave from low frequency oscillator 5. As is well known, the wave-form of the output of balanced modulator 7 will be the product of the wave-forms of the input waves, since the carrier (the output of FM modulator 3) is suppressed. This wave-form will accordingly be $$\cos ft \cos (\omega t + m_f \cos ft)$$

The output of balanced modulator 7 is fed in phase opposition to two antennas N and S equally spaced from antenna O, forming an Adcock antenna system. An Adcock system need not be used, since any antenna system providing a figure-of-eight radiation pattern is suitable.

The output of low frequency oscillator 5 is also passed through phase shifter 9, wherein its phase is shifted by 90 electrical degrees. The output of phase shifter 9 is then modulated upon the output of FM modulator 3 in a second balanced modulator 11, whose output having wave form $$\sin ft \times \cos (\omega t + m_f \cos ft)$$

in turn energizes two more antennae E and W in phase opposition. Antennae E and W form a second Adcock antenna at right angles to antennae N and S, and are equally spaced from antenna O by the same distance as antennae N and S. Hence the four antennae N, S, E, W, are placed at the corners of a square and antenna O is at the center of this square.

By the above arrangement, there is radiated from the antenna system O, N, S, E, W, radiant energy having a cardioid radiation pattern, which cardioid rotates at the frequency $f/2\pi$. This radiant energy is composed of a carrier frequency $\omega/2\pi$ frequency modulated or otherwise characterized by the same low frequency $f/2\pi$.

Although this transmitter has been described using frequency modulation, it is also contemplated to use phase modulation or any combination of phase and frequency modulation which does not depend upon the amplitude of the radiated wave. All such arrangements are deemed to be patentably equivalent. Applicant has herein used the term "angle modulation" to connote any such form of modulation that periodically characterizes the carrier energy without affecting its amplitude, e. g., wherein the instantaneous frequency of the carrier is varied periodically within predetermined limits, specifically at a rate synchronous with the rotation of the pattern. The instantaneous frequency of the radiated wave may be herein defined to be the reciprocal of the time period extending between corresponding points of adjacent cycles of the radiated wave.

At the receiver, shown in Fig. 2, the radiated wave is received at antenna 13 and amplified in radio frequency amplifier 15. The wave shape of the received wave will have the form $$[1+\cos(ft-\theta)]\cos(\omega t+m_f \cos ft)$$

and is illustrated in Fig. 8a.

The amplified wave is then fed to a standard frequency modulation receiver comprising voltage limiter 17 and FM detector 19. The output of this detector will have a wave shape of the form $\cos ft$, and is shown in Fig. 8f.

This wave of Fig. 8f has certain discontinuities 28, caused by failure of FM detector 19 to operate satisfactorily when the input voltage drops to a very low value. However, the "flywheel" effect of inductance and capacitance in the circuit will carry the wave though such discontinuities and a substantially pure sinusoidal wave will result.

The received and amplified wave is also fed to a standard amplitude modulation (AM) detector 21, whose output will then have the form $$\cos(ft-\theta)$$

shown in Fig. 8e, where $\theta$ is the orientation of the receiver with respect to the transmitter, as shown in Fig. 1A. The outputs of the two detectors 19, 21, are fed to any suitable phase comparator 23, which will then indicate angle $\theta$, and therefore show directly the orientation of the receiver with respect to the transmitter.

Fig. 3 shows a modified form of transmitter, which has the advantage of greater simplicity, since the antenna O has been eliminated. Here the output of low frequency oscillator 5 is doubled in frequency by frequency doubler 6 before being frequency modulated on the radio frequency derived from oscillator 1 in FM modulator 3. The modulator output, having a wave shape $$\cos(\omega t+m_f \cos 2ft)$$

is supplied to balanced modulators 7 and 11. No omni-directional antenna O is used.

The output of low frequency oscillator 5 having wave shape $\cos ft$, is fed directly to balanced modulator 7, wherein it is amplitude modulated upon the wave from modulator 3. The output of modulator 7, having wave shape $$\cos ft \cos(\omega t+m_f \cos 2ft)$$

is fed in phase opposition to antennae N and S and is there radiated.

The output of low frequency oscillator 5 is also fed into phase shifter 9, wherein it is phase shifted 90 degrees and appears in the output as a wave having wave shape $\sin ft$. This wave is fed into balanced modulator 11, and also modulates the output of FM modulator 3. The output of modulator 11, having wave shape $$\sin ft \cos(\omega t+m_f \cos 2ft)$$

is fed in phase opposition to antennae E and W, and is there radiated.

The transmitted wave will therefore be a figure-of-eight pattern rotating at frequency $f/2\pi$ and frequency modulated by frequency $2f/2\pi$.

It is clear that general angle modulation could be used here also, without being restricted to frequency modulation.

The wave received by a receiver R located as shown in Fig. 1A, will have the wave shape $$\cos(ft-\theta)\times\cos(\omega t+m_f\times\cos 2ft)$$

and is represented in Fig. 9a, the angle $\theta$ being as before the orientation of the receiver with respect to the transmitter.

While the above transmitters of Figs. 1 and 3 have been described as obtaining their rotating radiation patterns by purely electrical means, it is also within the scope of the present invention to use any suitable type of apparatus for producing rotating radiation patterns, and includes mechanical or other means as well as electrical.

Fig. 4 shows a suitable circuit for receiving this wave. The wave is picked up by receiving antenna 13 and amplified in radio-frequency amplifier 15. A wave derived from the output of amplifier 15, having wave shape $$\cos(ft-\theta)\times\cos(\omega t+m_f \cos 2ft)$$

as shown in Fig. 9a, is then passed through voltage limiter 17, whose output wave will be as represented in Fig. 9b. This limited wave is then detected in FM detector 19, and the resulting output wave-shape will be substantially $\cos 2ft$, as shown in Fig. 9e. The breaks in the curve shown between dotted lines 25 are due to the fact that the input wave has zero amplitude at those points, resulting in improper detecting action in FM detector 19. However, as discussed above, the flywheel effect of capacitance and inductance will carry the wave of Fig. 9e through such discontinuities, and will result in substantially a continuous sinusoidal wave.

At the same time, the received and amplified wave (Fig. 9a) is detected in amplitude modulation detector 21, resulting in the wave shown in Fig. 9f. This wave has a component of frequency $$\frac{2f}{2\pi}$$

and when passed through filter 27 yields a wave having wave shape $\cos 2(ft-\theta)$.

The outputs from detector 19 and filter 27 are fed to any suitable phase comparator 23, which will then indicate the angle $2\theta$, or may be calibrated directly to read $\theta$.

Fig. 5 shows a particular form of indicator which may be used with the circuit of Fig. 4, replacing that portion of Fig. 4 to the right of broken line A—A. As shown in Fig. 5, the output of the FM detector 19 is fed to the horizontal pair of deflecting plates of a cathode ray tube 31, the vertical deflecting plates being connected to the output of AM detector 21. Adjustable biasing voltages, such as may be obtained by batteries 47, 49 and potentiometers 51, 53, are connected in series with the control voltages obtained from detectors 19 and 21.

It will be remembered that the voltage output from detector 19 has the wave shape shown in Fig. 9e, and that from detector 21 has wave shape of Fig. 9f. Potentiometer 51 is adjusted so that the deflection of the cathode ray beam due to the output of FM detector 19 is symmetrical about the center of the cathode ray screen 55. Potentiometer 53 is adjusted until the beam trace due to the output of AM detector 21 alone will lie entirely above, and just touch, the horizontal diameter 57 of the tube screen. Then a blocking shield 59 is placed over the screen. Shield 59 completely covers screen 55 except for a narrow horizontal slit 61. The lower edge of slit 61 may carry indications 62, graduated in degrees.

In operation, the cathode ray here will appear through slit 61 only when the minimum values of the wave of Fig. 9f occur. The horizontal position of the trace at this time will depend on the instantaneous phase of the wave of Fig. 9e. Hence, this portion of the trace will define a sharp pointed index 63 which may cooperate with graduations on scale 62 to give directional indications.

In order that changes in intensity of the received wave shall not necessitate frequent readjustment of potentiometer 51, automatic volume control may be used on radio frequency amplifier 15, the control voltage being derived from AM detector 21.

It is to be noted that the indicator of Fig. 5 could also be used with the transmitted waves from the transmitter of Fig. 1.

Fig. 6 shows a modified form of receiver, suitable for use with either the transmitter of Fig. 1 or that of Fig. 3. Referring first to the transmitter of Fig. 3, the received wave, shown in Fig. 9a, is amplified in amplifier 15 and then limited in amplitude by limiter 17. The limited wave (Fig. 9b) is then FM detected, as in Fig. 4, to produce the wave of Fig. 9e in its output. This wave, of frequency $2f$, is phase-shifted 90 electrical degrees in phase shifter 29, and then the original wave and phase-shifted wave are applied to respective pairs of deflecting plates of a cathode ray tube 31. As is well known, these deflecting voltages tend to produce a circular cathode ray trace, shown at 33 in Fig. 6A.

The limited wave of Fig. 9b is also amplitude detected by detector 21, to produce the current wave shown at Fig. 9c. This current is passed through the primary winding of transformer 35, whose secondary voltage will then be as shown in Fig. 9d. This secondary voltage is then applied in series with a battery 37 to the control grid of tube 31.

Battery 37 is so chosen that, in the absence of secondary voltage from transformer 35, the cathode ray beam of tube 31 is cut off. The positive pulses 39 of the waves of Fig. 9d serve to unblock the beam, and a momentary spot trace 41 results. The angular position of this spot 41 from a fixed datum, such as line 43, will represent the angle $2\theta$. Hence the face of tube 31 may carry a scale 45, which may be directly calibrated in terms of $\theta$, whereby the orientation of the receiver with respect to the transmitter can be read directly.

The device of Fig. 6 may also be used with the transmitter of Fig. 1. Referring to Fig. 8, the current output of detector 21 would be as shown in Fig. 8c. The transformer secondary voltage will be as in Fig. 8d. The output of FM detector 19 will be as in Fig. 8f. Accordingly, the cathode ray trace will be as in Fig. 6A, but the angle indicated will be $\theta$ itself, rather than $2\theta$ as previously described.

Fig. 7 shows a modification of Fig. 6. The portion between lines C—C and B—B of Fig. 7 may be substituted for the corresponding portion of Fig. 6, and the entire Fig. 7 may be substituted for the portions of Fig. 6 to the right of line C—C—B.

In Fig. 7, the output of detector 21 and transformer 35 (Fig. 8d or Fig. 9d) is fed into amplifier tube 65, biased just to cut-off, as by battery 67. The output of tube 65 will therefore correspond only to the positive portions of Fig. 8d or 9d. This output is applied to accelerating electrode 69 of cathode ray tube 31. The cathode ray beam is no longer blocked, as in Fig. 6, but has a full circular trace 71. Whenever a pulse from tube 65, corresponding to positive portion 38 or 39 of the waves of Fig. 8d or 9d, reaches electrode 69, the beam is retarded (electrons slowed down), and the electrons are therefore more readily deflected by the deflecting plates. As a result, a definite index 73 appears on the trace, which cooperates with scale 45 to give direction indication.

Index 73 will indicate angle $\theta$ when the transmitter of Fig. 1 is used, or angle $2\theta$ when that of Fig. 3 is used.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. In a radio direction-finding system, means for radiating energy having a rotating directional radiation pattern, and means for phase modulating said radiated energy at the same frequency as the frequency of rotation.

2. In a radio direction-finding system, means for radiating energy having a rotating directional radiation pattern, and means for frequency modulating said radiated energy by a frequency which is an integral multiple, including unity, of the frequency of rotation.

3. In a radio direction-finding system as in claim 2, means for receiving said rotating directional radiation pattern, means for detecting said frequency modulation, means for detecting the amplitude modulation caused by sweeping of said pattern past said receiving means, and means for comparing said detected waves.

4. In a radio direction-finding system, means for radiating electromagnetic energy having a rotating directional radiation pattern, means for angle modulating said radiated energy at an integral multiple of the frequency of rotation, receiver means for receiving said energy, means for detecting said angle modulation, means for amplitude detecting said received wave, a cathode ray tube, and means for applying said detected waves to the deflecting plates of said tube to indicate the receiver bearing.

5. In a radio direction finding system, means for radiating electromagnetic energy having a rotating directional radiation pattern, means for angle modulating said radiated energy at a frequency which is an integral multiple including unity of the frequency of rotation, receiver means for receiving said energy, means for detecting said angle modulation, means for amplitude detecting said received wave, a cathode ray tube, and means for applying said detected waves to the deflecting plates of said tube to indicate the receiver bearing from said radiating means.

6. In a radio direction finding system, means for radiating electromagnetic energy having a rotating directional radiation pattern, means for angle modulating said radiated energy at a frequency which is an integral multiple including unity of the frequency of rotation, receiver means for receiving said energy, means for detecting said angle modulation, means for amplitude detecting said received wave, a cathode ray tube, and means for applying said detected waves to beam-controlling electrodes of said tube to indicate the receiver bearing from said radiating means.

7. A system as in claim 2, further comprising means for receiving said radiated energy, means for detecting said frequency modulation, a cathode ray tube, means for controlling deflection of the cathode ray beam by said detected wave, and means controlling the intensity of said beam by the amplitude of said received wave.

8. A system as in claim 2, further comprising means for receiving said radiated wave, means for detecting said frequency modulation, a cathode ray tube, means for controlling deflection of said beam by said detected wave, and means for further controlling said beam by the amplitude of said received wave.

9. A radio direction finding system comprising a source of electromagnetic energy of carrier frequency, a source of reference frequency, means for angle modulating said reference frequency upon said carrier frequency, means for radiating said modulated wave in a cardioid radiation pattern, and means for rotating said pattern at a frequency which is a sub-multiple, including unity, of said reference frequency.

10. A radio direction finding system comprising means for radiating electromagnetic energy having a rotating figure-of-eight radiation pattern, and means for frequency modulating said radiated energy at a frequency which is an integral multiple, including unity, of said rotation frequency.

11. A method of radio direction finding, comprising the steps of radiating a rotating directional radiation pattern of electromagnetic energy and frequency modulating said radiated energy at the same frequency as the frequency of rotation.

12. In a method of radio direction finding, the steps of radiating a rotating directional radiation pattern of electromagnetic energy, and frequency modulating said radiated energy at a frequency which is an integral multiple, including unity, of the frequency of rotation.

13. A method of radio direction finding comprising the steps of radiating a rotating cardioid radiation pattern of electromagnetic energy and frequency modulating said radiated energy at a frequency which is an integral multiple including unity, of the frequency of rotation.

14. A method of radio direction finding comprising the steps of radiating a rotating figure-of-eight radiation pattern of electromagnetic energy and frequency modulating said radiated energy, at a frequency which is an integral multiple, including unity, of the frequency of rotation.

15. In a radio direction-finding system, means for radiating high frequency energy having a rotating directional radiation pattern, means for progressively varying the instantaneous frequency of said energy relative to a predetermined mean periodically in synchronism with the rotation of said pattern, and means for determining the bearing of a receiving station relative to said energy-radiating means including means for comparing an amplitude characteristic of the received energy with the deviation of the corresponding instantaneous frequency from said mean.

16. In a method of radio direction finding, the steps comprising rotating a directional radiant energy pattern, progressively varying the instantaneous frequency of said energy relative to a predetermined mean periodically in synchronism with the rotation of said pattern, and determining the instantaneous radial position of said pattern by comparing an amplitude characteristic of the received radiated energy with the deviation of the corresponding instantaneous frequency from said mean.

17. In a method of radio direction finding, the steps comprising rotating a directional radiant energy pattern, varying an amplitude-independent characteristic of said energy to provide a reference, and comparing an amplitude characteristic of the received radiated energy with the reference derived from said amplitude-independent characteristic to determine the instantaneous radial position of said pattern.

18. In a radio direction-finding system, means for radiating high frequency energy having a rotating directional radiation pattern, including means for radiating a portion of said energy omnidirectionally, and means for modulating at constant amplitude at least said omnidirectionally-radiated portion of said energy by a frequency synchronized with the frequency of rotation.

19. In a radio direction-finding method, the steps comprising rotating a directional radiant energy pattern with a substantially omnidirectional component, and imparting positional reference data to said pattern by frequency modulating at least said omnidirectional component of said pattern in synchronism with the rotation of said pattern.

20. A radio direction finding system comprising a source of electromagnetic energy of carrier frequency, a source of reference frequency, means for angle modulating said reference frequency upon said carrier frequency, means for radiating said modulated wave in a directional radiation pattern, and means for rotating said pattern at a frequency which is a submultiple, including unity, of said reference frequency.

21. The method of determining direction in space, which comprises producing a continually rotating directional wave radiation pattern, frequency modulating the wave produced in this pattern, receiving the wave porduced in said pattern and comparing the phase relation between an amplitude demodulated alternating current produced by the reception of the rotating directional radiation pattern and a frequency demodulated alternating current resulting from the frequency modulation of the radio wave in said radiation pattern.

22. A radio frequency receiver for receiving the radio wave of a rotating directional wave radiation pattern in which said wave is frequency modulated, said receiver including a high frequency input stage responsive to amplitude modulated and frequency modulated radio frequency oscillations, means for separating amplitude modulated oscillations from frequency modulated oscillations, means for demodulating amplitude modulated oscillations, means for demodulating frequency modulated oscillations, and means for comparing the phase relation between an alternating current derived from said amplitude demodulating means and an alternating current derived from said frequency demodulating means for ascertaining the position of said radio frequency receiver with respect to said frequency modulated rotating directional radiation pattern.

23. The method of determining direction in space, which comprises producing a continually rotating directional wave radiation pattern, frequency modulating the wave produced in this pattern at a given rate with respect to the rotational speed of the directional radiation pattern, receiving the wave produced in said pattern, detecting the rotational wave received from said radiation pattern and the frequency modulated radiation thereof, subjecting the oscillations produced in response to the reception of the rotating radiation pattern to an amplitude demodulation and the frequency modulated oscillations to a frequency demodulation, and comparing the phase relation between the alternating currents resulting from the amplitude demodulation and the frequency demodulation for ascertaining the direction of the radio receiver relative to the radio transmitter.

24. The method as set forth in claim 23, wherein the frequency of the produced wave is modulated at a rate which corresponds to the number of revolutions per second with which the directional radiation pattern rotates.

25. The method as set forth in claim 23, wherein the frequency of the produced wave is modulated at a rate which is an integral multiple of the number of revolutions per second with which the directional radiation pattern rotates.

26. A radio frequency receiver cooperating with a radio frequency transmitter producing a continuously rotating directional radiation pattern and frequency modulated at a rate which is an integral multiple of the number of revolutions with which the directional radiation pattern rotates, comprising a high frequency input stage responsive to amplitude modulated and frequency modulated radio frequency oscillations, means for demodulating amplitude modulated oscillations, means for demodulating frequency modulated oscillations, means for stepping up the frequency of an alternating current produced in said amplitude demodulating means to the frequency of an alternating current resulting from said frequency demodulating means, and means for comparing the phase relation between said currents for ascertaining the direction in space of said radio frequency receiver relative to said radio frequency transmitter.

27. A radio frequency receiver as set forth in claim 26, wherein said means for stepping up the frequency of an alternating current produced in said amplitude demodulating means comprises a selective circuit responsive to a frequency which is an integral multiple of the frequency occurring at the output of said amplitude modulating means.

28. A radio frequency receiver cooperating with a radio frequency transmitter producing a continuously rotating directional radiation pattern and frequency modulated at a rate which is an integral multiple of the number of revolutions with which the directional radiation pattern rotates, comprising a high frequency input stage responsive to amplitude modulated and frequency modulated radio frequency oscillations, means for demodulating amplitude modulated oscillations, means for demodulating frequency modulated oscillations, and a phase measuring device for comparing the phase relation between an alternating current produced in said frequency demodulating means and an alternating current resulting from said amplitude demodulating means, means being provided in said phase measuring device for stepping up the effect of the frequency of the last-named alternating current to that of the first-named alternating current.

29. A radio frequency receiver as set forth in claim 28, wherein said phase measuring device includes means for furnishing direct readings concerning the direction of said receiver relative to said radio frequency transmitter.

30. The method of determining direction in space, which comprises producing a continually rotating directional wave radiation pattern, frequency modulating the wave produced in this pattern, receiving the wave produced in said pattern, and comparing the phase relation between an amplitude demodulated alternating current produced by the reception of the rotating directional radiation pattern and a frequency demodulated alternating current resulting from the frequency modulation of the radio wave in said radiation pattern.

MORRIS RELSON.